(12) United States Patent
Chan et al.

(10) Patent No.: US 6,525,650 B1
(45) Date of Patent: Feb. 25, 2003

(54) ELECTRONIC SWITCHING MATRIX

(75) Inventors: Steven S. Chan, Alhambra, CA (US); George M. Hayashibara, Los Angeles, CA (US); Chun-Hong Harry Chen, Torrance, CA (US); Davie C. Liu, Rancho Palos Verdes, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/330,335

(22) Filed: Jun. 11, 1999

(51) Int. Cl.[7] .................................................. H04Q 5/22
(52) U.S. Cl. .................. 340/14.69; 340/14.1; 340/14.2; 340/2.2; 340/2.21; 340/2.27; 455/103; 455/277.1; 455/562
(58) Field of Search .............................. 340/14.1, 14.2, 340/14.69, 2.2, 2.21, 2.22, 2.25, 2.27; 455/562, 277.1, 103; 370/336, 337, 338

(56) References Cited

U.S. PATENT DOCUMENTS

| | | | |
|---|---|---|---|
| 3,833,866 A | | 9/1974 | Boutelant |
| 4,438,302 A | * | 3/1984 | Hruda ....................... 200/17 R |
| 4,472,691 A | | 9/1984 | Kumar et al. |
| 4,495,498 A | | 1/1985 | Petrelis et al. |
| 4,682,127 A | | 7/1987 | Magarshack |
| 4,731,594 A | | 3/1988 | Kumar |
| 5,200,746 A | * | 4/1993 | Yoshifuji ..................... 340/2.22 |
| 5,216,420 A | * | 6/1993 | Munter ....................... 340/14.2 |
| 5,594,939 A | | 1/1997 | Curello et al. |
| 5,752,200 A | * | 5/1998 | Meredith et al. ........... 455/562 |
| 6,006,113 A | * | 12/1999 | Meredith ..................... 455/562 |

* cited by examiner

Primary Examiner—Michael Horabik
Assistant Examiner—Yves Dalencourt
(74) Attorney, Agent, or Firm—McAndrews, Held & Malloy, Ltd.

(57) ABSTRACT

A high density electronic switching matrix (ESM) includes several splitting modules (200) arranged along a first axis, each including a signal input (202) and several splitter outputs (204). The ESM (500, 600) further includes several switching modules (400) arranged along a second axis perpendicular to the first axis. Each switching module (400) includes switching inputs (402) coupled individually to an output of each of the splitting modules (200). The ESM (500, 600) is further characterized by couplings between the splitter modules and the switching modules. The couplings are formed by mating male and female connectors (300) integrated into the splitting modules and the switching modules. The couplings support extremely high frequency operation. The splitting modules (200) and the switching modules (400) may thus be coupled closely together to form a dense, high frequency, switching matrix, and may be stacked upon one another.

20 Claims, 6 Drawing Sheets

Legend:
SW = 4 by 1 Switch

ELECTRONIC SWITCHING MATRIX

BACKGROUND OF THE INVENTION

The present invention generally relates to electronic switching matrices. In particular, the present invention relates to compact, millimeter wave switching matrices for use in electronic beam forming applications.

Electronic switching matrices (ESMs) are used in electronic communications networks to route signal energy from appropriate inputs to appropriate outputs. ESMs are frequently employed in communications network elements such as earth stations and satellites. In a satellite, for example, an ESM may be used to switch signal energy received over an uplink channel to the appropriate downlink channel.

ESMs typically have two stages. In the first stage, the incoming signal energy is split by use of power splitters (for example, by a Wilkinson power splitter.) Once each of the incoming signals is split, the split signals are fed into a series of switches. The switches are often implemented using Wilkinson power combiners.

One of the difficulties encountered with conventional implementations of ESMs is the large power loss associated with the use of Wilkinson power combiners. At each stage of combination, there is approximately a 3 dB (half-power) loss. Since the signal typically goes through multiple levels of combination, this loss is very significant. The need to amplify the signal along the way may be costly in terms of both physical dimension and weight of the ESMs. This poses particular problems in ESMs for satellite applications, where size, weight and power conservation are extremely important factors in design cost, performance, and reliability.

Another difficulty with conventional ESMs is that the splitting stages and the switching stages are typically interconnected by coaxial cable or similar means. In high frequency applications, impedance mismatch in the connectors may cause substantial signal energy loss. Also, this cabling further adds to the physical dimension and weight of the ESM. Again this may increase costs substantially.

Yet another difficulty with prior ESMs is their failure to provide for scalability, particularly as the signal frequency handled by the communication systems increases. The failure to provide this scalability causes substantial redesign costs as new technologies increase the frequencies at which communications systems operate.

The presence of these and other problems in past ESMs demonstrates that a need has long existed for an improved ESM.

BRIEF SUMMARY OF THE INVENTION

It is an object of the present invention to provide an electronic switching matrix.

Another object of the present invention is to provide an electronic switching matrix that reduces mismatch in the connections between the components of the switching system.

Still another object of the present invention is to provide an electronic switching matrix that provides a small, low-loss, microwave switching matrix for applications where a large number of input ports need to be connected to a large number of output ports.

Yet another object of the present invention is to provide an electronic switching matrix that provides for wideband performance, allowing low frequency signal and millimeter wave signal switching from the input ports to the output ports.

One or more of the foregoing objects are met in whole or in part by a preferred embodiment of the present invention that provides a compact ESM that utilizes low-loss, high frequency switches in the switching modules. The ESM includes several splitting modules arranged along a first axis. Each splitting module includes a signal input and several splitter outputs. The ESM further includes several switching modules arranged along a second axis perpendicular to the first axis. Each switching module generally includes switching inputs coupled individually to an output of each of the splitting modules.

The ESM is further characterized by the couplings between the splitter modules and the switching modules. The couplings are formed by mating male and female connectors integrated into the splitting modules and the switching modules. The couplings support extremely high frequency operation. The splitting modules and the switching modules may thus be coupled closely together to form a dense, high frequency, switching matrix. To this end, the splitting and the switching modules may be stacked upon one another, and may be hermetically sealed.

In one embodiment, the ESM is configured as a 128 input by 52 output switching matrix. In this configuration, for example, 128 splitter modules may be used in conjunction with 13 switching modules. In another embodiment, the ESM is configured as a 512 input by 52 output switching matrix. In this configuration, 512 splitter modules may be used in conjunction with 13 switching modules.

The splitter modules may be arranged along a first side and an opposite side of the switching modules. The splitter modules may thus be evenly distributed between the first and opposite sides of the switching modules to increase the density of the ESM. Furthermore, the splitter modules may be arranged along each of the four sides of the switching modules, thereby providing an extremely high density ESM.

DETAILED DESCRIPTION OF THE INVENTION

Figure 1:
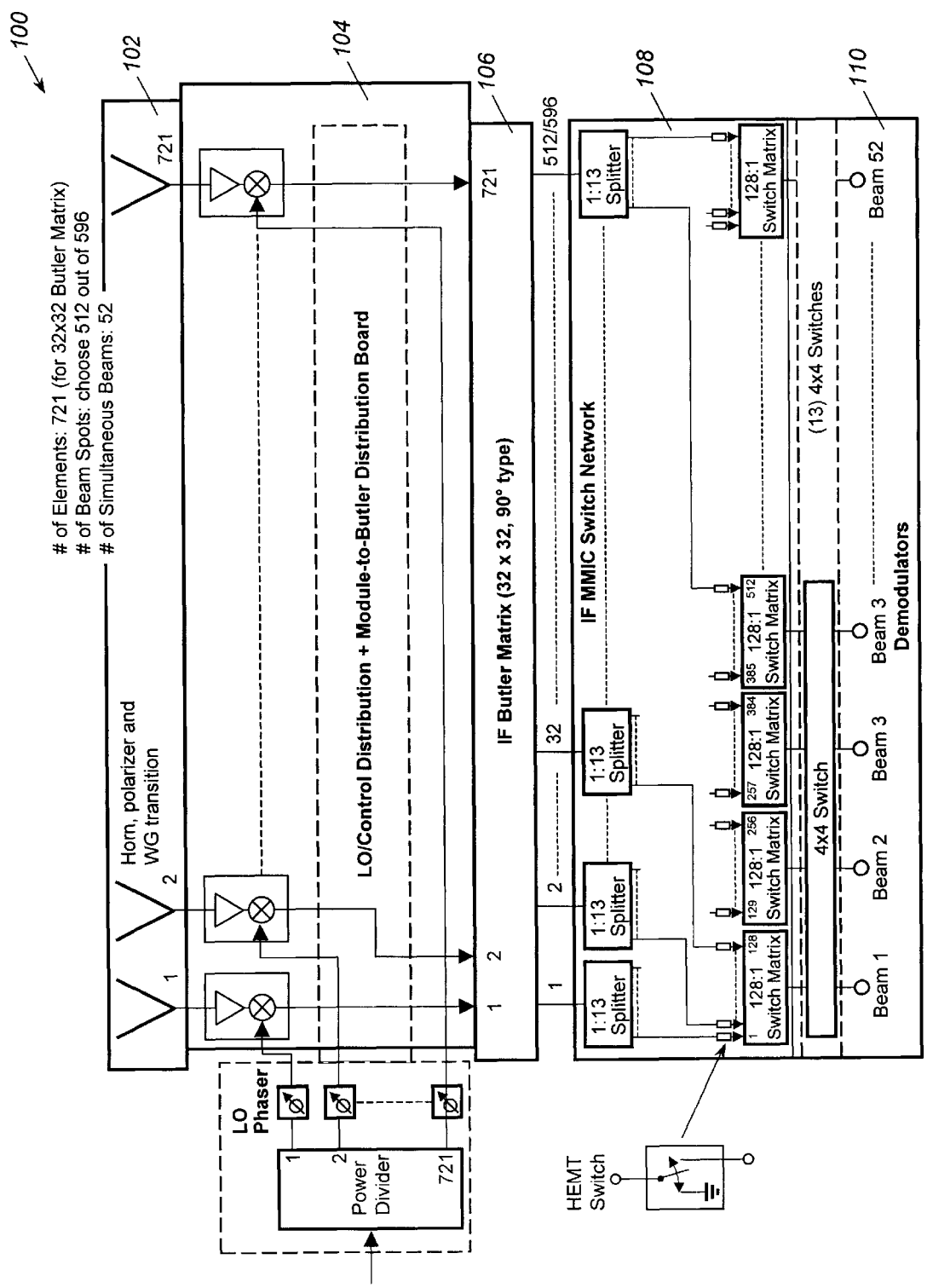
FIG. 1 illustrates a schematic diagram of a portion of a communications network node.

FIG. 1 illustrates a schematic diagram 100 of a portion of a communications network node 100. Present in the figure are an antenna aperture 102, reception modules 104, a Butler matrix 106, an electronic switch matrix (ESM) 108, and demodulators 110.

Signal energy arriving at the antenna aperture 102 is passed to the reception modules 104. After the reception modules 104 have received and performed preprocessing (e.g. electronic steering) on the signal energy to generate received signals, they are passed through the Butler matrix 106. Once the signals have passed through the Butler matrix 106, they arrive at the inputs of the ESM 108.

The ESM 108 maps the received signals at its inputs to the appropriate outputs. Once this mapping has occurred, the selected signals exit the ESM 108 and pass to the demodulators 110. Subsequently, the demodulated signals may be further processed. The ESM 108 may be comprised of two types of interconnected components: splitting modules and switching modules.

Figure 2:
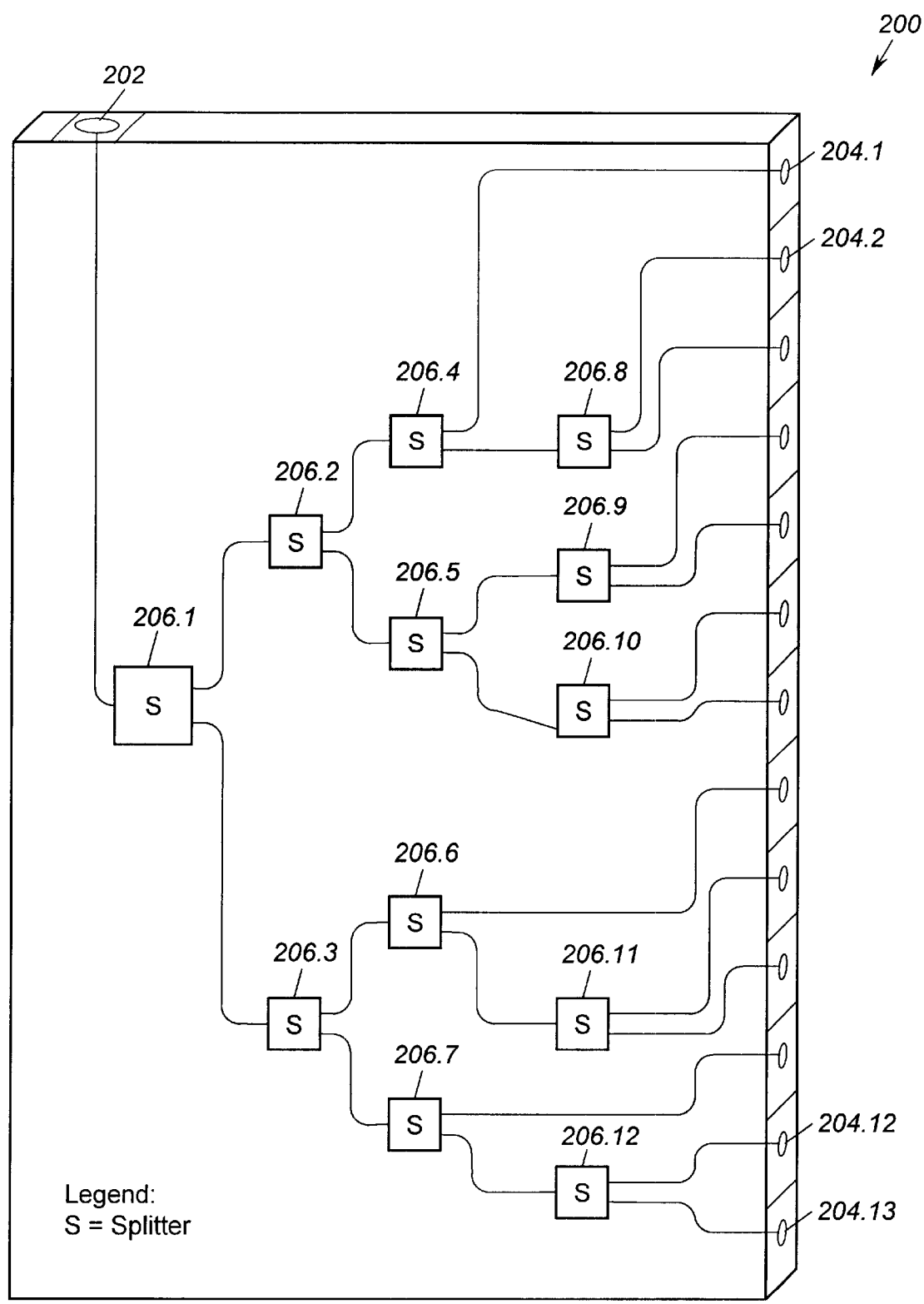
FIG. 2 illustrates a schematic diagram of a splitting module.

Turning now to FIG. 2, that figure illustrates a schematic diagram of a splitting module 200. FIG. 2 shows an input connector 202 and 13 output connectors 204.1–204.13. FIG. 2 also shows 12 two-way splitters 206.1–206.12 connected in cascade. The splitters 206.1–206.12 need not be two-way splitters, however, and the number of output connectors may vary between applications.

The splitters 206.1 through 204.13 may be implemented, for example, using Wilkinson splitters suitable for splitting signals in the frequency range for which the ESM is to be used.

The input connector 202 and the output connectors 204.1–204.13 of the splitting module 200 are integrated into the module to facilitate connection with other system components, and in particular the switching modules. Further, the input and output connectors are compact, which allows for a reduction in the size of the splitting module (and thus the ESM as a whole). Preferably, the input and output connectors used in each the splitting and switching modules are impedance matched to the frequencies of the signals switched by the ESM.

Figure 3:
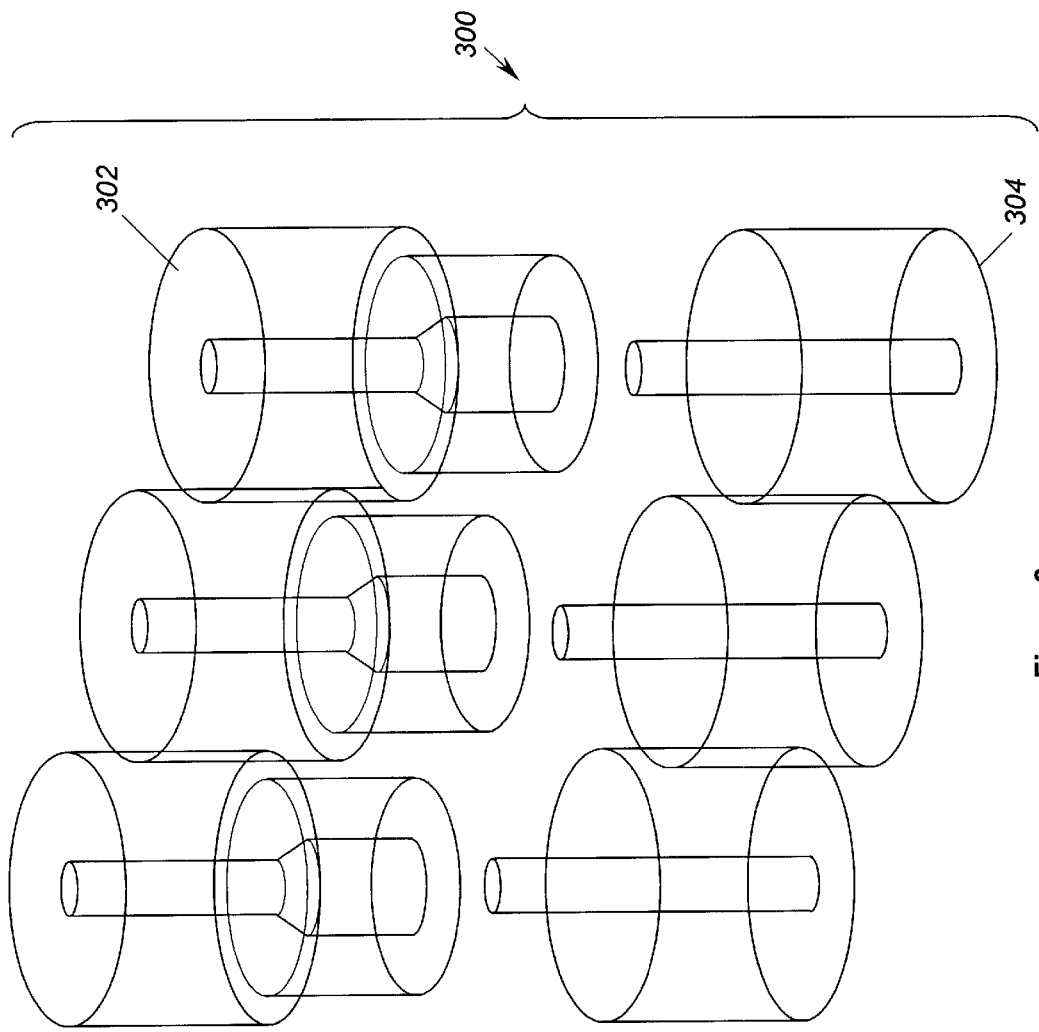
FIG. 3 illustrates a connector for use in an ESM.

Turning to FIG. 3, that figure illustrates three identical connectors 300 that the ESM 108 preferably uses, allowing operation to at least 40 GHz. Each connector 300 includes a female portion 302 and a male portion 304 (i.e., the connector has complementary mating portions). The female portion 302 of the connector 300 is preferably integrated into one of the two system components to be connected (i.e., the splitting module or the switching module). The complementary portion (in this instance, the male portion 304) of the connector 300 is then integrated into the other system component to be connected.

The connector 300 is much smaller in size than the connectors used in past ESMs, including coaxial cable, Gilbert connectors and GPPO connectors. When multiple connectors 300 are placed side to side, the spacing of each connector 300 may be as close as 0.075 inches. The conductive portions of the connector are preferably made from Kovar. The preferred dimensions, construction materials, and fabrication techniques used to integrate the complementary mating connectors on the splitter modules and switching modules.

Figure 4:
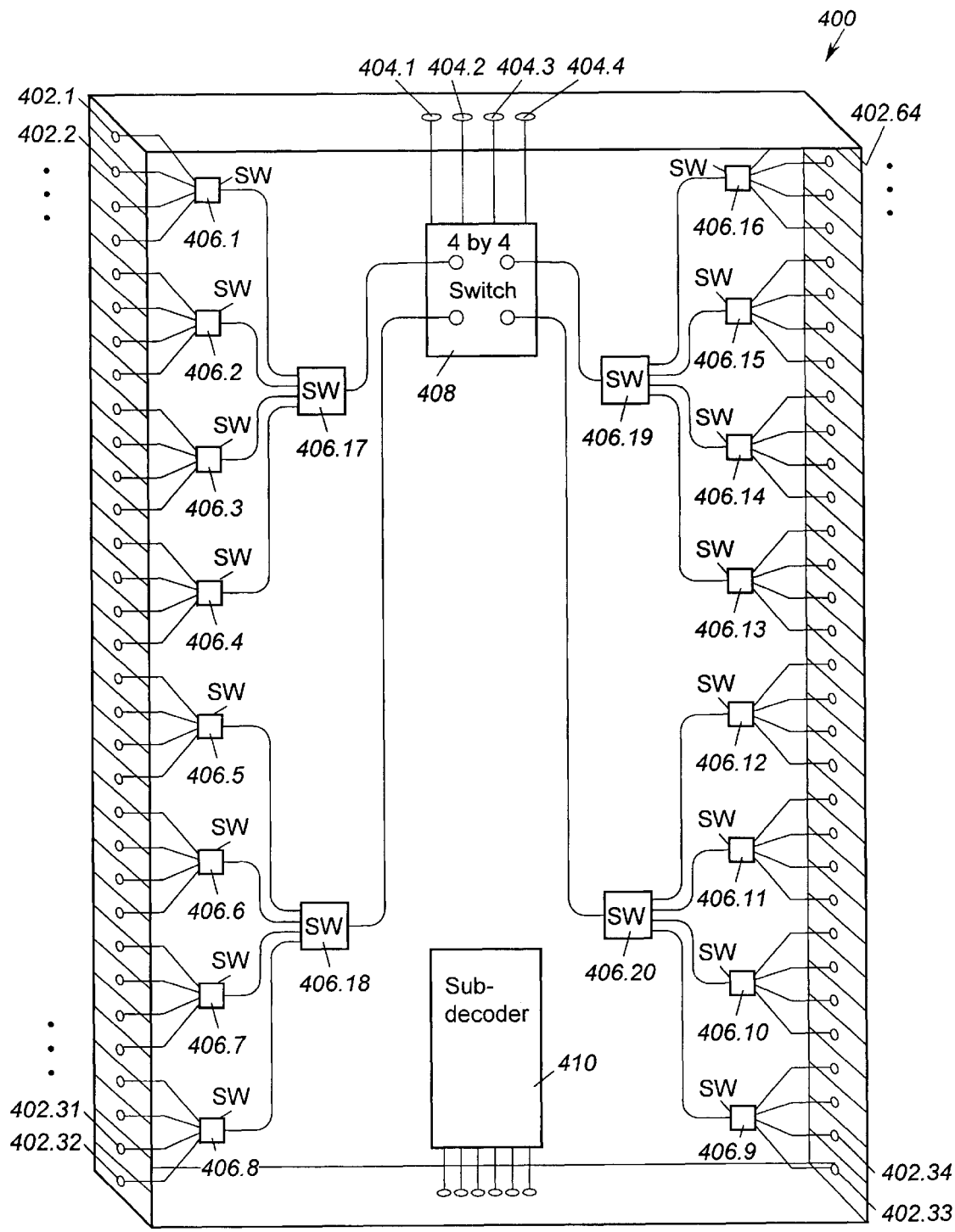
FIG. 4 illustrates a schematic diagram of a switching module.

With reference to FIG. 4, that figure shows a schematic diagram of a switching module 400. FIG. 4 also shows 64 input connectors 402.1 through 402.64. Also illustrated in the figure are output connectors 404.1–404.4, twenty 4 by 1 switches 406.1 through 406.20, a 4 by 4 switch 408, and a subdecoder 410. In general, a switching module may have any number of input connectors. For an M by N ESM, the number of input connectors on each of the switching modules will typically be M. Also, as the specific application requires, the 4 by 4 switch may be replaced with an S by S switch, where S is a positive integer. However, the number of outputs of each of the switching modules is preferably S. For a given M by N ESM, S will be equal to the N divided by the number of switching modules used in the implementation.

As signals are input at each of the 64 input connectors of the switching module, the signals arrive at the inputs of the first level of the cascaded 4 by 1 switches (in FIG. 4, switches 406.1 through 406.16). The subdecoder determines which of the 4 signals being received by each of the 4 by 1 switches should be selected to appear at each switch output.

In cases, as here, where multiple levels of 4 by 1 switches exists, the outputs of each of the first level of 4 by 1 switches is fed into an input of a second level 4 by 1 switch (in this example, switches 406.17 through 406.20). Once the signals have been switched a sufficient number of times to have selected S of the M input signals, in this case 4, those S signals will be fed into the inputs of the S by S switch (here, the 4 by 4 switch 408). The subdecoder 410, based on the control signals it receives, will control the operation of the 4 by 4 switch 408.

The subdecoder thus determines which of the 4 input signals received by the 4 by 4 switch 408 will appear at its outputs. The 4 by 4 switch 408 is capable of mapping the signals in any order, and may use any of the signals at its inputs multiple times. Thus, it is possible, for example, for the 4 by 4 switch 408 to have the same signal on each of its four outputs. The outputs of the 4 by 4 switch 408 are coupled to the 4 output connectors 404.1 through 404.4 of the switching module 400.

Each of the 4 by 1 switches 406.1 through 406.20 is capable of switching signals at the desired operational frequency of the ESM. For example, these switches may be TRW part number SQH105C, (available from TRW, Inc., Redondo Beach, Calif.) capable of switching signals up to 13 GHz. Preferably, each of the 4 by 1 switches 406.1–406.20 self-terminate the inputs that are not selected. The self-termination is accomplished by terminating the unused port(s) to 50 OHMS.

As the frequencies over which communications occur increase, the ESM may be upgraded by replacing the switches 406.1–406.20 and 408 with switches capable of operating at the desired frequencies. No further redesign is necessary. Thus, the present invention provides for substantial performance increases with minimal redesign.

Figure 5:
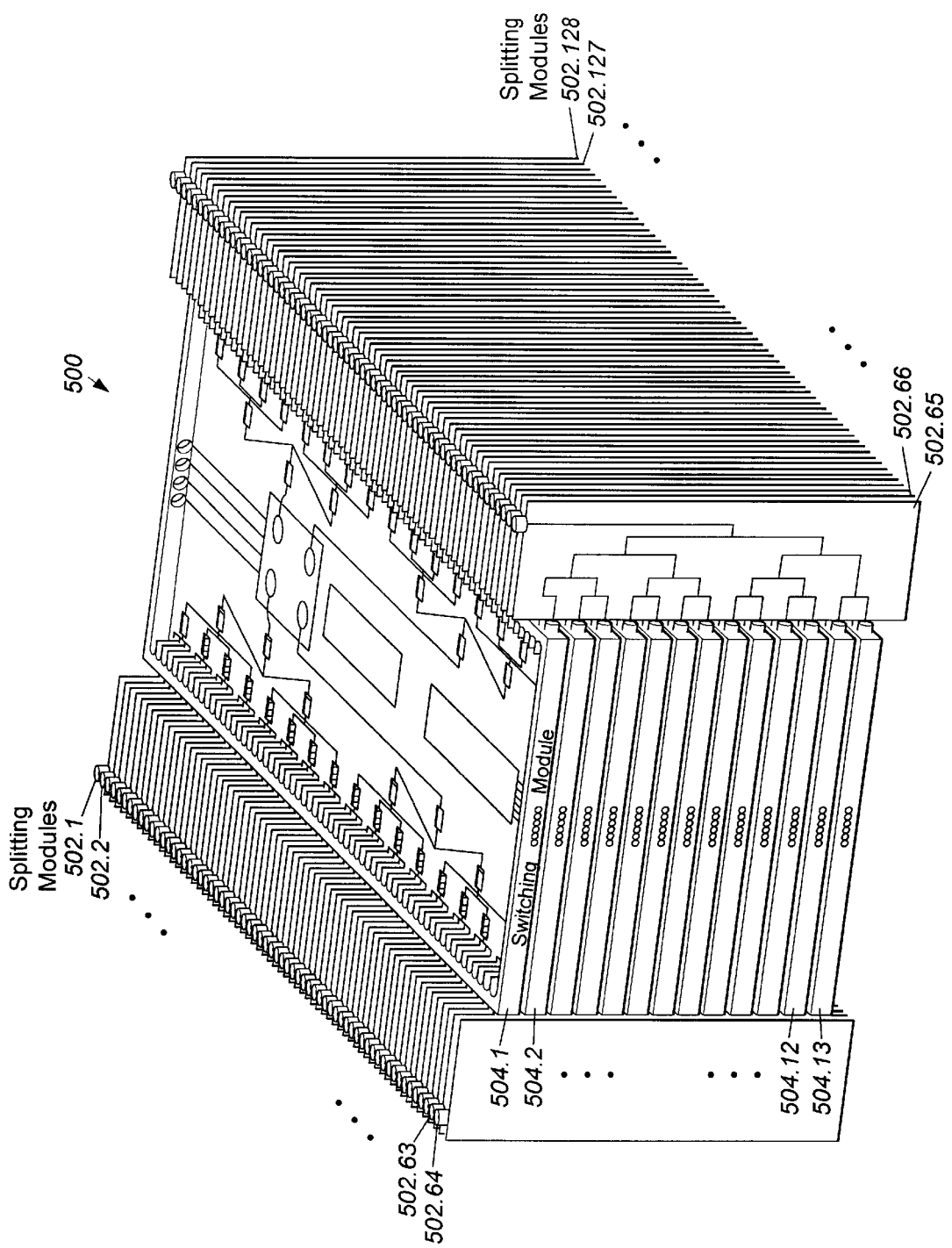
FIG. 5 illustrates an electronic switching matrix.

Turning now to FIG. 5, that figure illustrates a 128 by 52 ESM 500 comprising 128 splitting modules 502.1–502.128 and 13 switching modules 504.1–504.13. In this case, M=128, N=32, and S=4. The switching modules 504.1–504.13 are arranged horizontally and are stacked on top of one another. This modular design further enhances the overall compactness of the ESM. The splitting modules 502.1–502.128 are arranged vertically. One output of each splitting module is connected to an input of each switching module. Thus, any switching module may select any one of the 128 ESM inputs.

Figure 6:
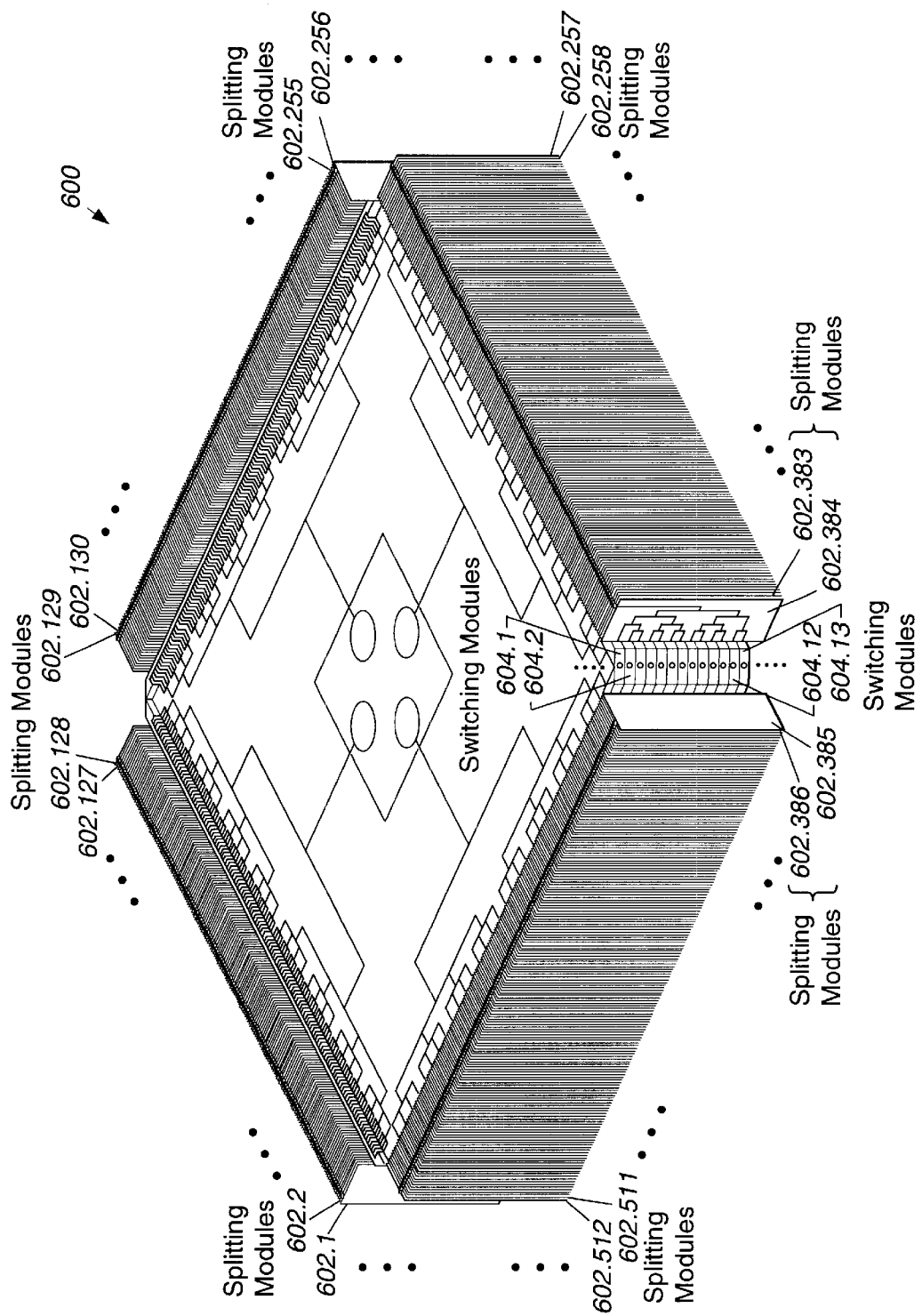
FIG. 6 illustrates another embodiment of an electronic switching matrix.

With reference to FIG. 6, that figure illustrates a 512 by 52 ESM 600 comprising 512 splitting modules 602.1–600.512 and 13 switching modules 604.1 604.13. In this case, M=512, N=52, and S=4. Again, the splitting modules are arranged vertically and the switching modules are arranged horizontally, providing substantial space savings.

The present invention thus overcomes many limitations found in prior electronic switching matrices. The present invention provides for a smaller and lighter ESM. The present invention also provides a means of connecting the two stages of the ESM with minimal mismatch, allowing for operation in increased frequency ranges. Further, the decreases in size, weight and power loss make it possible for the ESM of the present invention to switch a large number of inputs top a large number of outputs. The simplified design of the present invention also provides for scalability as the frequency bands used in communications systems increase in the future. While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the spirit and scope of the invention.

What is claimed is:

1. A broadband switching matrix, comprising:
   a plurality of splitting modules arranged along a first axis, each splitting module including a signal input and a plurality of splitter outputs;
   a plurality of switching modules arranged along a second axis perpendicular to the first axis, each switching module including a plurality of switching inputs coupled individually to an output of each of the splitting modules; and
   wherein couplings between the splitter outputs and the switching inputs are formed by mating complementary connectors integrated into the splitting modules and the switching modules,
   whereby the splitting modules and the switching modules may be coupled closely together to form a dense, high frequency, switching matrix,
   wherein the splitter modules are arranged along a first side and an opposite side of the switching modules.

2. The switching matrix of claim 1, wherein the splitting modules are stacked upon one another along the first axis.

3. The switching matrix of claim 2, wherein the switching modules are stacked upon one another along the second axis.

4. The switching matrix of claim 1, wherein the switching modules are stacked upon one another along the second axis.

5. The switching matrix of claim 1, wherein the switching modules are hermetically sealed switching modules.

6. The switching matrix of claim 1, wherein said switching matrix is a 128 input by 52 output switching matrix.

7. The switching matrix of claim 1, wherein said switching matrix is a 512 input by 52 output switching matrix.

8. The switching matrix of claim 1, wherein the splitter modules are arranged along a first side and an opposite side of the switching modules.

9. The switching matrix of claim 1, wherein the splitter modules are distributed evenly along the first side and the opposite side of the switching modules.

10. The switching matrix of claim 7, wherein the splitter modules are arranged along a first side, a second side, a third side, and a fourth side of the switching modules.

11. The switching matrix of claim 1, wherein the splitter modules are arranged along a first side, a second side, a third side, and a fourth side of the switching modules.

12. The switching matrix of claim 10, wherein the splitter modules are distributed evenly along the first side, the second side, the third side, and the fourth side of the switching modules.

13. An M input N output broadband switching matrix, comprising:
    M splitting modules arranged along a first axis, each splitting module including a signal input and a plurality of splitter outputs;
    S switching modules arranged along a second axis perpendicular to the first axis, each switching module including a plurality of switching inputs coupled individually to an output of each of the splitting modules, each switching module further comprising N/S switched outputs; and
    wherein couplings between the splitter outputs and the switching inputs are formed by mating male and female connectors integrated into the splitting modules and the switching modules,
    whereby the splitting modules and the switching modules may be coupled closely together to form a dense, high frequency, M by N switching matrix,
    wherein the splitter modules are distributed approximately equally along a first side and an opposite side of the switching modules.

14. The switching matrix of claim 13, wherein the splitting modules are stacked upon one another along the first axis.

15. The switching matrix of claim 14, wherein the switching modules are stacked upon one another along the second axis.

16. The switching matrix of claim 13, comprising 128 splitter modules and 13 switching modules.

17. The switching matrix of claim 13, comprising 512 splitter modules and 13 switching modules.

18. The switching matrix of claim 13, wherein the splitter modules are distributed approximately equally along a first side, a second side, a third side, and a fourth side of the switching modules.

19. The switching matrix of claim 1 wherein the splitter modules are arranged along K sides of the switching modules, where K is greater than one.

20. The switching matrix of claim 13 wherein the splitter modules are arranged along K sides of the switching modules, where K is greater than one.

* * * * *